June 12, 1945.　　　A. S. PITRE ET AL　　　2,377,899
CONDUIT
Filed Aug. 9, 1943

Inventors
ANTONIO S. PITRE
EARL WILSON

By
Attorney

Patented June 12, 1945

2,377,899

UNITED STATES PATENT OFFICE 2,377,899

CONDUIT

Antonio S. Pitre, United States Navy, and
Earl Wilson, Sebastopol, Calif.

Application August 9, 1943, Serial No. 497,989

2 Claims. (Cl. 219—39)

(Granted under the act of March 3, 1883, as
amended April 30, 1928; 370 O. G. 757)

This invention relates to conduits and more specifically to conduits for high-melting-point materials.

In general, it is an object of the invention to provide a device which is simple of construction, quickly and readily manufactured from inexpensive common materials, which may be repaired by workmen at the place of operation and which may be used with safety, economy and ease.

Another object of the invention is to provide a conduit in which material may solidify and which delivers heat primarily only to the solidified material and in sufficient amount to liquefy it; to provide a conduit which maintains high-melting point material therein in a fluid condition with safety to the operator; to provide such a conduit having an electrical heating element so positioned that an arc across a break in that element does not primarily attack the material of the conduit; and to provide such a conduit which operates with a maximum of speed and with a minimum of input energy.

Other objects of the invention will, in part, be obvious, and will, in part, appear hereinafter.

The invention accordingly comprises articles of manufacture possessing the features, properties and relation of elements that will be exemplified in the articles hereinafter described, the scope of the application of which will be indicated in the claims.

Figure 1:
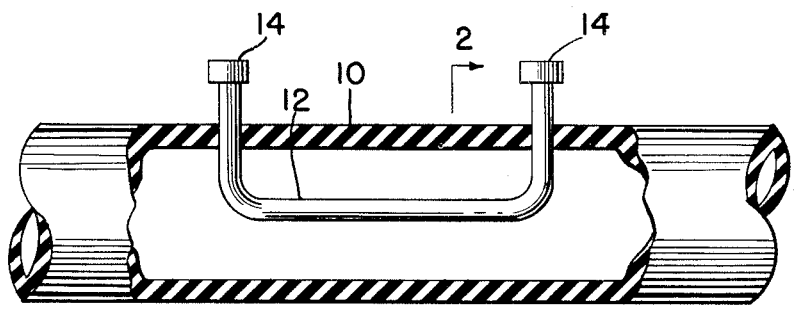
Figure 2:
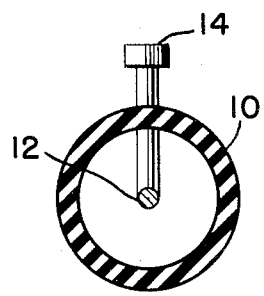

For a better understanding of the invention, reference should be had to the following description taken in connection with the drawing, in which Fig. 1 is a longitudinal view in cross section of a device embodying one form of the invention; and Fig. 2 is a cross section of the device shown in Fig. 1 taken at a plane, the trace of which is the line 2—2 in Fig. 1.

Spray application is used for coatings which are solid at atmospheric temperatures, which melt at high temperatures, and which, for reasons, are applied at still higher temperatures. Hot, plastic, ships' hull paints are applied at temperatures as high as 400° F. Some of these melt at about 300° F. An operator on scaffolding sprays the paint from a spray gun to which the paint is brought from a heating kettle through a conduit which may be fifty feet long. From time to time the operator shuts off the flow of paint temporarily. It may be shut off over night. On these occasions the paint in the conduit partly or wholly solidified; also, it always tended to congeal toward the forward end of the conduit, merely from radiation and heat conduction losses.

Attempts have been made to supply sufficient heat to the conduit either to maintain the paint fluid, and at a predetermined temperature, or to bring it to that temperature from the solid state. Hitherto, this has been attempted electrically by the use of an electric resistance in the wall of the conduit. Some of the heat developed in such conduits passed radially outward and was wholly lost for the purpose desired. Those conduits were so dangerous that their use was forbidden in enclosed or metal-lined compartments and many workmen refused to operate with these conduits under any conditions. With ordinary rubber hose steam had to be applied every time the material in the hose froze—a long, laborious, inefficient process. The danger from the wire in the conduit wall arose when an arc started in the wall between the ends of a broken section of the conductor. The material of the conductor immediately burned or at least was so weakened that it gave way; the hot inflammable liquid burst through under high pressure, caught fire from the arc, and was thrown burning in all directions. The exposed conductor ends under high voltage gave an exposed arc of high amperage tending to short to any near metal as the broken hose whipped back and forth. In spite of deaths caused by this prior type of conduit, it was used until the present invention.

The conduit described below brings the material to be conducted to, and maintains it at, the proper temperature. Its use involves no danger. It is used by hundreds and there has not been a single breakdown or accident. Danger has been eliminated. There is no wire in the wall of the conduit. Further, all of the heat developed in the heating unit is transferred to the material that is to be kept warm and none is lost before it has accomplished that purpose.

The conductor in the wall of prior tubing so weakened the structure that for a predetermined inner diameter the prior tubing had to have an outer diameter almost fifty percentum greater than the outer diameter of the tubing used with the present invention and for a given fluid capacity the prior tubing weighed 200 per centum as much as the present tubing including all electrical elements.

The position of the conductor in the wall of the best prior tubing was never uniform. Sometimes it was dangerously near the surface of the tubing.

In the drawing 10 denotes a conduit of any suitable material. It may be of polymerized chloroprene and may have an inside diameter of ⅜-inch. An electric conductor 12 extends longitudinally within the space in the conduit. Its dimensions depend upon the amount of heat to be supplied. For heating a hot plastic paint to 400° F. the conductor may be a 1 by 19 strand, 1/16-inch diameter, flexible, steel cable. A tensile strength of not less than 400 pounds, and a resistance of 3 ohms per 100 feet with a current of 15 amperes at a temperature of 121.11° C. are desirable. A 50 foot length of such a conductor is adapted to deliver 2000 watts of energy.

Electrodes 14 may be attached to the conductor. These are for being connected to a source of electric tension.

The invention described herein may be manufactured and used by or for the Government of the United States of America for governmental purposes without the payment of any royalties thereon or therefor.

What we claim as new and desire to secure by Letters Patent is:

1. In combination, a flexible conduit for receiving high melting point material which is solid at atmospheric temperatures and fluid at high temperatures, and a flexible electrical conductor disposed within said conduit and extending along within the passage of said conduit and exposed to contact with said material to maintain and deliver the material in a highly heated fluid state, said flexible electrical heating conductor and said flexible conduit being of such relative dimensions as to insure the melting of the material therein and to provide a substantial space therebetween for the introduction and passage therethrough of the high melting point material.

2. In combination, a flexible conduit of electrically insulating material for receiving high melting point material which is solid at atmospheric temperatures and fluid at high temperatures, and a flexible electrical heating conductor disposed within said conduit and extending throughout substantially the entire length of said conduit and having terminal portions extending through the wall of said conduit, said electrical heating conductor being exposed to said material for heating the material throughout substantially the entire length of the conductor between said terminal portions to maintain and deliver the material in a highly heated fluid state, said flexible electrical heating conductor and said flexible conduit being of such relative dimensions as to insure the melting of the material therein and to provide a substantial space therebetween for the introduction and passage therethrough of the high melting point material.

ANTONIO S. PITRE.
EARL WILSON.